(12) United States Patent
Endo (10) Patent No.: US 8,294,836 B2
(45) Date of Patent: Oct. 23, 2012

(54) LIQUID CRYSTAL DISPLAY DEVICE AND PROJECTOR

(75) Inventor: Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 874 days.

(21) Appl. No.: 12/326,516

(22) Filed: Dec. 2, 2008

(65) Prior Publication Data

US 2009/0147158 A1 Jun. 11, 2009

(30) Foreign Application Priority Data

Dec. 6, 2007 (JP) .................................. 2007-315489
Oct. 21, 2008 (JP) .................................. 2008-270609

(51) Int. Cl.
*G02F 1/1335* (2006.01)
(52) U.S. Cl. .................. 349/8; 349/40; 349/117; 349/5; 359/352; 359/511; 361/752
(58) Field of Classification Search .............. 349/5, 119, 349/117, 96, 40, 8, 122, 137, 58
See application file for complete search history.

(56) References Cited

U.S. PATENT DOCUMENTS

| | | | |
|---|---|---|---|
| 5,657,140 A * | 8/1997 | Xu et al. ........................ | 349/118 |
| 5,940,155 A * | 8/1999 | Yang et al. .................... | 349/120 |
| 6,678,023 B1 * | 1/2004 | Yamazaki et al. .............. | 349/95 |
| 6,784,961 B2 | 8/2004 | Suzuki et al. | |
| 6,885,422 B2 * | 4/2005 | Suzuki et al. ................. | 349/121 |
| 6,954,245 B2 * | 10/2005 | Mi et al. ........................ | 349/119 |
| 6,985,198 B2 * | 1/2006 | Kume et al. ................... | 349/119 |
| 7,030,951 B2 | 4/2006 | Suzuki et al. | |
| 7,126,649 B2 | 10/2006 | Chen et al. | |
| 2005/0168662 A1 * | 8/2005 | Nakagawa ....................... | 349/5 |
| 2007/0258029 A1 * | 11/2007 | Nakagawa et al. ............ | 349/119 |
| 2008/0218672 A1 * | 9/2008 | Ichihashi et al. .............. | 349/118 |
| 2009/0059143 A1 * | 3/2009 | Shutou et al. ................. | 349/119 |
| 2009/0122243 A1 * | 5/2009 | Sugiyama et al. ............ | 349/118 |

FOREIGN PATENT DOCUMENTS

| | | |
|---|---|---|
| JP | A-2002-014345 | 1/2002 |
| JP | A-2003-287603 | 10/2003 |
| JP | A-2004-198650 | 7/2004 |
| JP | A-2006-505014 | 2/2006 |
| JP | A-2007-286609 | 11/2007 |
| JP | A-2008-15300 | 1/2008 |
| JP | A-2008-26538 | 2/2008 |
| JP | A-2008-176168 | 7/2008 |

* cited by examiner

*Primary Examiner* — Edward Glick
*Assistant Examiner* — Sang Nguyen
(74) *Attorney, Agent, or Firm* — Oliff & Berridge, PLC (57) ABSTRACT

A liquid crystal display device includes: a liquid crystal panel which has a liquid crystal device containing liquid crystal operating in twist nematic mode and a micro-lens array disposed adjacent to the liquid crystal device; a first optical compensating plate disposed on the incident side of the liquid crystal panel to optically compensate the liquid crystal device; and a second optical compensating plate disposed on the exit side of the liquid crystal panel to optically compensate the liquid crystal device. A first retardation of the first optical compensating plate in system optical axis direction is larger than a second retardation of the second optical compensating plate in the system optical axis direction.

12 Claims, 5 Drawing Sheets

LIQUID CRYSTAL DISPLAY DEVICE AND PROJECTOR

BACKGROUND

1. Technical Field

The present invention relates to a liquid crystal display device for forming images and a projector including the liquid crystal display device.

2. Related Art

Currently, a liquid crystal projector which includes a twist-nematic-type liquid crystal panel and two compensating optical elements formed by sapphire plates or the like and disposed between the liquid crystal panel and a light emission side polarizing plate is known. The sapphire plates have optical axes inclined at a predetermined angle to the light emission surface in the rubbing direction of an orientation film (see JP-A-2004-198650). According to this type of liquid crystal projector, the pre-tilt of the liquid crystal can be compensated by controlling the optical axes and thicknesses of the compensating optical elements disposed in the vicinity of the liquid crystal panel to improve contrast.

Moreover, a number of technologies capable of enhancing display characteristics by using micro-lens array provided on the liquid crystal panel for converging illumination light on pixels have been proposed (for example, see JP-A-2003-287603).

According to the liquid crystal panel disclosed in JP-A-2004-198650, the compensating optical elements are disposed on the light emission side. In this structure, limitation is imposed on the positions of the compensating optical elements by the space on the emission side, back-focus of the projection lens, and the like in some cases. In this structure, the compensating optical element needs to be provided on the light incident side as well as on the light emission side. In this case, no problem occurs when the liquid crystal panel does not include micro-lens array. However, when the liquid crystal panel includes the micro-lens array, inclination of light on the light emission side generally varies due to the effect of the micro-lens array. As a result, accurate compensation cannot be achieved.

SUMMARY

It is an advantage of some aspects of the invention to provide a liquid crystal display device capable of achieving compensation with relatively high accuracy even when compensating optical elements are disposed on both the light incident side and light emission side of a liquid crystal device having micro-lens array.

It is another advantage of some aspects of the invention to provide a projector including this liquid crystal display device.

A liquid crystal display device according to an aspect of the invention includes (a) a liquid crystal panel which has a liquid crystal device containing liquid crystal operating in twist nematic mode and a micro-lens array disposed adjacent to the liquid crystal device, (b) a first optical compensating plate disposed on the incident side of the liquid crystal panel to optically compensate the liquid crystal device, and (c) a second optical compensating plate disposed on the exit side of the liquid crystal panel to optically compensate the liquid crystal device. In this liquid crystal display device, (d) a first retardation of the first optical compensating plate in system optical axis direction is larger than a second retardation of the second optical compensating plate in the system the system optical axis direction.

In the liquid crystal display device having this structure, even when light entering the liquid crystal panel is subjected to geometrical and optical change for further diffusion by the effect of the micro-lens array, the functions or effects of the first and second optical compensating plates can be balanced such that the effect of this geometrical and optical change can be cancelled due to the condition that the first retardation of the first optical compensating plate is larger than the second retardation of the second optical compensating plate. Thus, the compensation by the first and second optical compensating plates is improved even when the first and the second optical compensating plates are disposed on the incident and exit sides of the liquid crystal panel for the purpose of compensation for pre-tilt of the liquid crystal device. Accordingly, the contrast and other characteristics of the liquid crystal display device can be enhanced.

It is preferable that both the first and second optical compensating plates are flat-plate-shaped components made of inorganic substance. In this case, it is preferable that the first retardation and the second retardation are determined based on the optical axis pole angle, refractive index, and thickness of the first optical compensating plate with respect to the system optical axis direction, and the optical axis pole angle, refractive index, and thickness of the second optical compensating plate with respect to the system optical axis direction, respectively. According to this structure, compensation for the pre-tilt of the liquid crystal device can be easily and accurately improved by controlling the optical axis pole angles, refractive indexes, and thicknesses of the first and second optical compensating plates.

It is preferable that the optical axis of the first optical compensating plate is inclined to a direction parallel with the rubbing direction of an orientation film provided on either the incident side or exit side of the liquid crystal device. In this case, it is preferable that the optical axis of the second optical compensating plate is inclined to a direction parallel with the rubbing direction of an orientation film provided on the other of the incident side and exit side of the liquid crystal device. According to this structure, the first optical compensating plate and the second optical compensating plate can be used for compensation of the pre-tilt of the liquid crystal adjacent to the orientation film disposed on the incident side of the liquid crystal device and for compensation of the pre-tilt of the liquid crystal adjacent to the other orientation film disposed on the exit side of the liquid crystal device.

It is preferable that the ratio of the second retardation of the second optical compensating plate to the first retardation of the first optical compensating plate is substantially equal to the ratio of effective F value on the exit side of the liquid crystal panel to effective F value on the incident side of the liquid crystal panel. When an angular aperture corresponding to light most inclined to the system optical axis contained in entering illumination light is $\alpha 1[°]$ considering one pixel on the liquid crystal panel, the effective F value on the incident side of the liquid crystal panel is expressed as $(\tan(90°-\alpha 1/2))/2$. Similarly, when an angular aperture corresponding to light most inclined to the system optical axis contained in emitted modulated light is $\alpha 2[°]$ considering one pixel on the liquid crystal panel, the effective F value on the exit side of the liquid crystal panel is expressed as $(\tan(90°-\alpha 2/2))/2$. In this structure, compensation for the pre-tilt by the first optical compensating plate and the second optical compensating plate can be balanced in quantity almost with accuracy.

The ratio of the second retardation of the second optical compensating plate to the first retardation of the first optical compensating plate is controlled or corrected such that the contrast characteristics and the like can be improved through simulation or trial manufacture.

A projector according to an aspect of the invention includes (a) the liquid crystal display device for light modulation described above, (b) a lighting device which illuminates the liquid crystal display device, and (c) a projection lens which projects an image formed by the liquid crystal display device.

This projector having the liquid crystal display device described above can project high-quality images by using the liquid crystal display device having preferable contrast and other characteristics.

A liquid crystal display device according to an aspect of the invention includes (a) a liquid crystal panel which has a liquid crystal device containing liquid crystal and a micro-lens array disposed on the incident side of the liquid crystal device, (b) a first optical compensating plate disposed on the incident side of the micro-lens array, and (c) a second optical compensating plate disposed on the exit side of the liquid crystal panel. In this liquid crystal display device, (d) a first retardation of the first optical compensating plate in system optical axis direction is larger than a second retardation of the second optical compensating plate the system optical axis direction. In this liquid crystal display device, even when the first and second optical compensating plates are subject to geometrical and optical change for diffusing light entering the liquid crystal panel by the effect of the micro-lens array, the first and second optical compensating plates can act in an appropriate manner such that this effect can be cancelled due to the condition that the first retardation of the first optical compensating plate is larger than the second retardation of the second optical compensating plate. In this structure, compensation by both the optical compensating plates can be improved, and thus the characteristics of the liquid crystal display device can be further enhanced.

It is preferable to further include a first polarization plate disposed on the incident side of the liquid crystal panel, and a second polarization plate disposed on the exit side of the liquid crystal panel in the liquid crystal display device according to the aspect of the invention. In this case, it is preferable that the first optical compensating plate is disposed between the first polarization plate and the liquid crystal panel, and that the second optical compensating plate is disposed between the liquid crystal panel and the second polarization plate.

A projector according to a fourth aspect of the invention includes (a) the liquid crystal display device for light modulation according to the aspect of the invention, (b) a lighting device which illuminates the liquid crystal display device, and (c) a projection lens which projects an image formed by the liquid crystal display device. This projector having the liquid crystal display device according to the aspect of the invention can project high-quality images by using the liquid crystal display device having preferable characteristics.

BRIEF DESCRIPTION OF THE DRAWINGS

The invention will be described with reference to the drawings, wherein like numbers reference like elements.

DESCRIPTION OF EXEMPLARY EMBODIMENT

Figure 1:
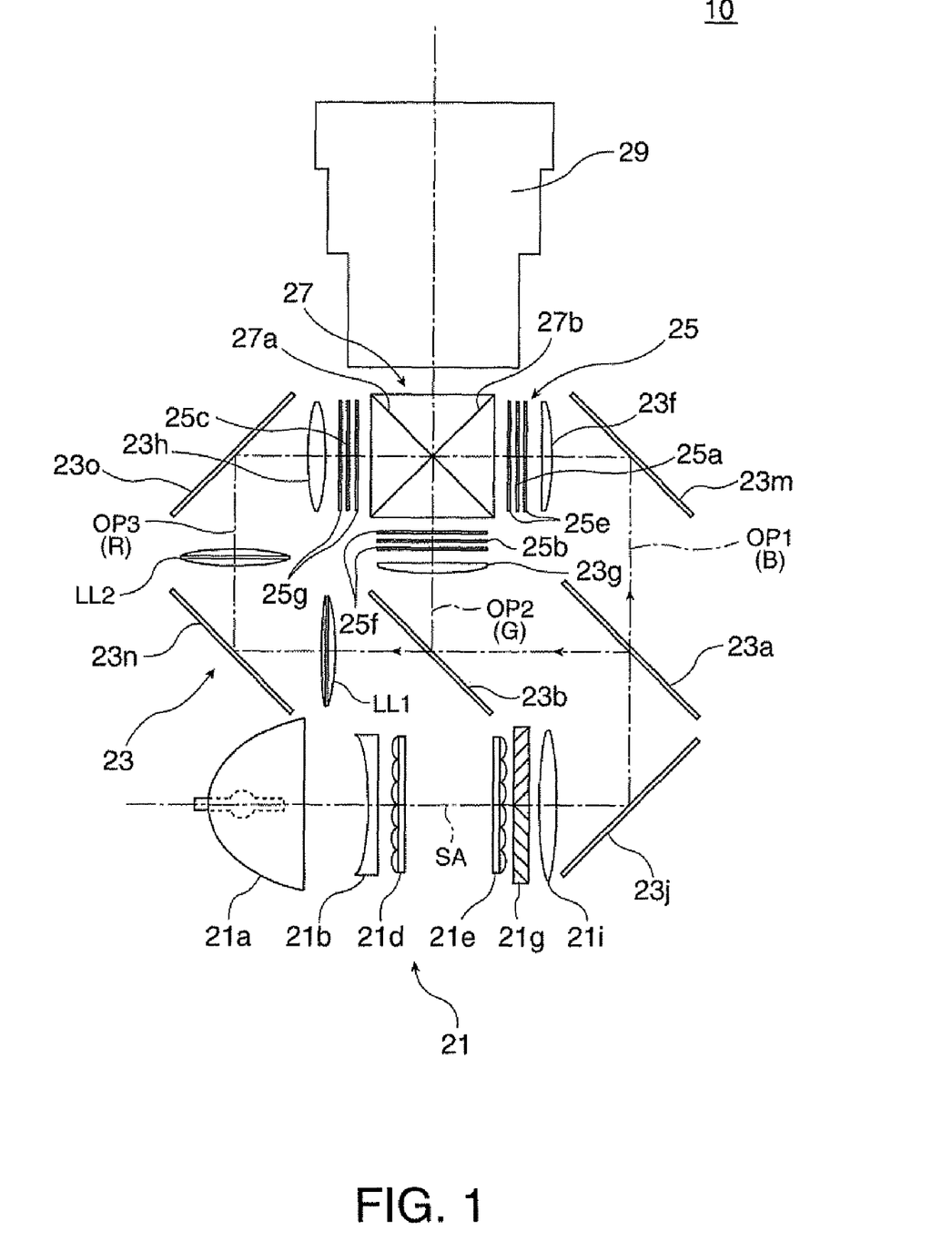
FIG. 1 illustrates a structure of optical systems included in a projector according to an embodiment.

FIG. 1 schematically illustrates optical systems of a projector including a liquid crystal display device according to an embodiment of the invention.

A projector 10 in this embodiment includes a light source device 21 for emitting source light, a color separating system 23 for dividing the source light released from the light source device 21 into three color lights of red, green, and blue, a light modulating unit 25 which receives the illumination lights in the respective color lights released from the color separating system 23, a cross dichroic prism 27 for combining image lights in respective colors released from the light modulating unit 25, and a projection lens 29 as projecting system for projecting the image light having passed through the cross dichroic prism 27 onto a screen (not shown). The light source device 21, the color separating system 23, the light modulating unit 25, and the cross dichroic prism 27 constitute an image forming apparatus for forming image light to be projected on the screen.

The light source device 21 of the projector 10 has a light source lamp 21a, a concave lens 21b, a pair of lens arrays 21d and 21e, a polarization converting member 21g, and a superimposing lens 21i. The light source lamp 21a is a high-pressure mercury lamp, for example, and has a concave mirror which collects the source light and releases the light toward the front. The concave lens 21b having effect of collimating the source light released from the light source lamp 21a may be eliminated. Each of the pair of the lens arrays 21d and 21e is constituted by a plurality of element lenses disposed in matrix, and divides the source light emitted from the light source lamp 21a and released from the concave lens 21b by the element lenses to separately converge and diffuse the divided lights. The polarization converting member 21g converts the source lights released from the lens array 21e into only S-polarized light components perpendicular to the sheet surface of FIG. 1, for example, and supplies the converted light to the subsequent optical system. The superimposing lens 21i generally converges the illumination light having passed through the polarization converting member 21g in an appropriate manner to supply the illumination light to the liquid crystal display devices in respective colors provided on the light modulating unit 25 for superimposed illumination. More specifically, the illumination lights having passed the lens arrays 21d and 21e and the superimposing lens 21i pass through the color separating system 23 which will be described later in detail to uniformly illuminate liquid crystal panels 25a, 25b and 25c in respective colors provided on the light modulating unit 25 for superimposed illumination.

The color separating system 23 has first and second dichroic mirrors 23a and 23b, three field lenses 23f, 23g, and 23h serving as a correction optical system, and reflection mirrors 23j, 23m, 23n, and 23o so that the color separating system 23 and the light source device 21 constitute a lighting device. The first dichroic mirror 23a reflects red light and green light of the three colors of red, green and blue, for example, and transmits blue light. The second dichroic mirror 23b reflects green light of the two colors of red and green thus received, for example, and transmits red light. In the color separating system 23, the optical path of the source light approximately in white emitted from the light source device 21 is bent by the reflection mirror 23*j* such that the bent light can enter the first dichroic mirror 23*a*. The blue light having passed through the first dichroic mirror 23*a* passes the reflection mirror 23*m* and enters the field lens 23*f* for controlling incident angle as S-polarized light without change, for example. The green light having reflected by the first dichroic mirror 23*a* and further reflected by the second dichroic mirror 23*b* enters the field lens 23*g* as S-polarized light without change, for example. The red light having passed through the second dichroic mirror 23*b* passes lenses LL1 and LL2 and the reflection mirrors 23*n* and 23*o*, and enters the field lens 23*h* as S-polarized light without change, for example. The lenses LL1 and LL2 and the field lens 23*h* constitute a relay system. The relay system has function of transmitting the image on the first lens LL1 to the field lens 23*h* via the second lens LL2 substantially without change.

The light modulating unit 25 has three liquid crystal panels 25*a*, 25*b*, and 25*c*, and three pairs of polarization filters 25*e*, 25*f*, and 25*g* between each pair of which the liquid crystal panels 25*a*, 25*b*, and 25*c* are interposed, respectively. The liquid crystal panel 25*a* for blue light disposed on a first optical path OP1 and a pair of the polarization filters 25*e*, 25*e* between which the liquid crystal panel 25*a* is disposed constitute a liquid crystal light valve for blue light which two-dimensionally modulates luminance of blue light based on image information. Similarly, the liquid crystal panel 25*b* for green light disposed on a second optical path OP2 and the corresponding polarization filters 25*f*, 25*f* constitute a liquid crystal light valve for green light, and the liquid crystal panel 25*c* for red light disposed on a third optical path OP3 and the corresponding polarization filters 25*g*, 25*g* constitute a liquid crystal light valve for red light.

The blue light having passed the first dichroic mirror 23*a* of the color separating system 23 and branched thereby enters the blue light first liquid crystal panel 25*a* via the field lens 23*f*. The green light reflected and branched by the second dichroic mirror 23*b* of the color separating system 23 enters the green light second liquid crystal panel 25*b* via the field lens 23*g*. The red light having passed the second dichroic mirror 23*b* of the color separating system 23 and branched thereby enters the red light third liquid crystal panel 25*c* via the field lens 23*h*. The respective liquid crystal panels 25*a* through 25*c* are non-emission-type liquid crystal display devices for modulating spatial intensity distribution of entering illumination light for each pixel. The three color lights having entered the liquid crystal panels 25*a* through 25*c* are modulated according to drive signals or image signals inputted to the liquid crystal panels 25*a* through 25*c* as electric signals. In this case, the polarization directions of illumination lights entering the liquid crystal panels 25*a* through 25*c* are controlled by the polarization filters 25*e*, 25*f*, and 25*g*, and component lights in predetermined polarization direction are extracted as image lights from the modulated light released from the liquid crystal panels 25*a* through 25*c*.

The cross dichroic prism 27 is a light combining member having substantially square shape in the plan view formed by affixing four rectangular prisms. A pair of dielectric multilayer films 27*a* and 27*b* crossing in an X shape are provided on the boundaries between the rectangular prisms affixed to each other. The first dielectric multilayer film 27*a* as one of the dielectric multilayer films reflects blue light, and the second dielectric multilayer film 27*b* as the other film reflects red light. The cross dichroic prism 27 reflects blue light coming from the liquid crystal panel 25*a* by the first dielectric multilayer film 27*a* to release the blue light to the right with respect to the light traveling direction, releases green light coming from the liquid crystal panel 25*b* such that the green light travels straight to be released via the first and second dielectric multilayer films 27*a* and 27*b*, and reflects red light coming from the liquid crystal panel 25*c* by the second dielectric multilayer film 27*b* to release the red light to the left with respect to the light traveling direction.

The projection lens 29 projects color image light combined by the cross dichroic prism 27 onto the screen (not shown) at a desired magnification. Thus, a color dynamic image or a color still image at a desired magnification corresponding to drive signals or image signals inputted to the liquid crystal panels 25*a* through 25*c* is projected on the screen.

Figure 2:
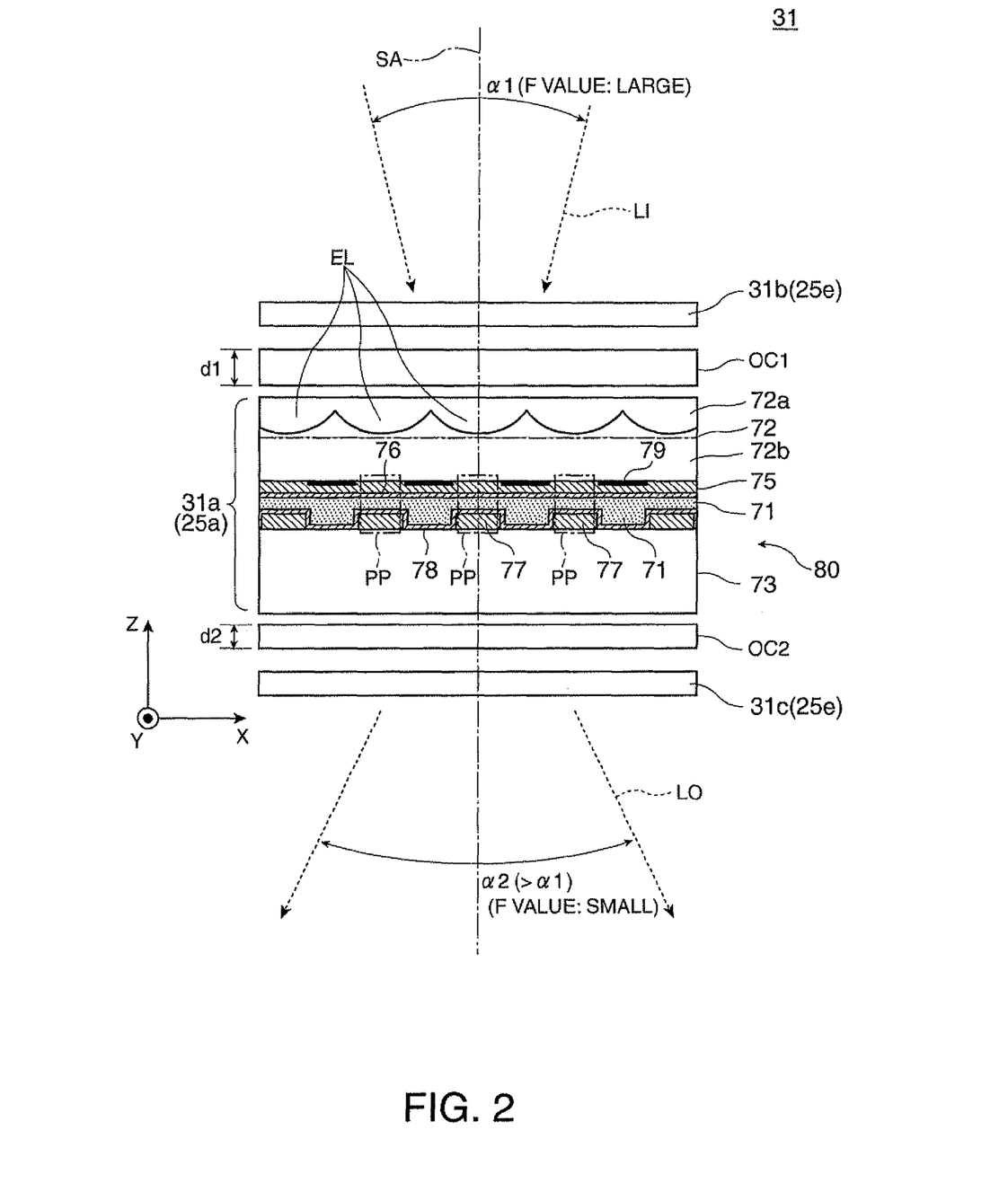
FIG. 2 is a cross-sectional view showing an enlarged liquid crystal light valve included in the projector shown in FIG. 1.

FIG. 2 is a cross-sectional view illustrating an enlarged structure of a liquid crystal light valve for a particular color constituting the light modulating unit 25 of the projector 10 shown in FIG. 1. A liquid crystal light valve 31 shown in this figure functions as a liquid crystal display device, and includes the liquid crystal panel 25*a* for blue light disposed on the first optical path OP1 and a pair of the polarization filters 25*e*, 25*e* between which the liquid crystal panel 25*a* is interposed, for example.

In the liquid crystal light valve 31 shown in the figure, a first polarization filter 31*b* as an incident side polarization element and a second polarization filter 31*c* as an exit side polarization element are disposed such that the normal lines on the incident and exit side surfaces extend in parallel with system optical axis SA, i.e., z axis. That is, the first and second polarization filters 31*b* and 31*c* are so disposed as to form Cross Nicol structure. The liquid crystal panel 31*a* is disposed between the first and second polarization filters 31*b* and 31*c*. More specifically, the first polarization filter 31*b* is disposed on the incident side of the liquid crystal panel 31*a*, and the second polarization filter 31*c* is disposed on the exit side of the liquid crystal panel 31*a*. The liquid crystal panel 31*a* two-dimensionally changes the polarization direction of input light LI having entered from the first polarization filter 31*b* for each pixel according to the input signal, and releases the modulated light after the change toward the second polarization filter 31*c* as output light LO. A first optical compensating plate OC1 is disposed on the incident side and a second optical compensating plate OC2 is disposed on the exit side between the liquid crystal panel 31*a* and the polarization filters 31*b* and 31*c*. These first and second optical compensating plates OC1 and OC2 have flat plate shape, and disposed such that the normal lines on the incident and exit side surfaces extend in parallel with the system optical axis SA, i.e., the z axis similarly to the polarization filters 31*b* and 31*c*.

The liquid crystal panel 31*a* has a first substrate 72 on the incident side and a second substrate 73 on the exit side with a liquid crystal layer 71 interposed between the first and second substrates 72 and 73. The liquid crystal layer 71 contains liquid crystals (i.e., twist-nematic-type liquid crystals) operated in twist nematic mode. These substrates 72 and 73 have flat plate shape, and are disposed such that the normal lines of the incident and exit side surfaces extend in parallel with the system optical axis SA, i.e., the z axis similarly to the polarization filters 31*b* and 31*c*. The first substrate 72 to which the input light LI enters has a micro-lens array 72*a* extending along a plane parallel with the XY surface, and a main body 72*b* disposed inside the micro-lens array 72*a*. The micro lens array 72*a* has a plurality of element lenses EL two-dimensionally disposed in a predetermined pattern corresponding to transparent pixel electrodes 77 to be described later, i.e., pixel portions PP.

In the liquid crystal panel 31*a*, a transparent common electrode 75 is provided on the surface of the first substrate 72 on the liquid crystal layer 71 side. An orientation film 76 is provided on the upper surface of the common electrode 75, for example. On the other hand, the plural transparent pixel electrodes 77 disposed in matrix and thin film transistors (not shown) electrically connected with the respective transparent pixel electrodes 77 are provided on the surface of the second substrate 73 on the liquid crystal layer 71 side. An orientation film 78 is provided on the upper surface of the transparent pixel electrodes 77 and the thin film transistors, for example. In this structure, the inside portion of the first substrate 72 (i.e., main body 72b), the second substrate 73, the liquid crystal layer 71 interposed between the first and second substrates 72 and 73, and the electrodes 75 and 77 function as a light active element, that is, a liquid crystal device 80 for modulating the polarization condition of the input light LI according to the input signal. Each of the pixel portions PP constituting the liquid crystal device 80 includes one pixel electrode 77, a part of the common electrode 75, a part of the orientation films 76 and 78, and a part of the liquid crystal layer 71. The respective pixel portions PP selectively receive the input light LI converged by the respective elements of the micro-lens array 72a provided on the incident side first substrate 72. A grid-shaped black matrix 79 is provided between the first substrate 72 and the common electrode 75 in such a manner as to section the respective pixel portions PP.

In the liquid crystal device 80 having this structure, the orientation films 76 and 78 are components for disposing liquid crystal compounds constituting the liquid crystal layer 71 in the required directions. The orientation film 76 on the incident side directs the liquid crystal compounds contacting the orientation film 76 in a first rubbing direction (such as X axis direction), and the orientation film 78 on the exit side directs the liquid crystal compounds contacting the orientation film 78 in a second rubbing direction (such as Y axis direction). Under the OFF condition in which no voltage is applied to the liquid crystal layer 71, the orientation film 76 has function of directing the optical axes of the liquid crystal compounds in a direction containing XZ plane as the polarization plane of the first polarization filter 31b, and the orientation film 78 has function of directing the optical axes of the liquid crystal compounds in a direction containing YZ plane as the polarization plane of the second polarization filter 31c. Thus, the optical axes of the liquid crystal compounds in the liquid crystal layer 71 are so disposed as to be gradually twisted from the first substrate 72 to the second substrate 73. That is, the optical axes of a pair of the liquid crystal compounds disposed at both ends of the liquid crystal layer 71 inside the first and second substrates 72 and 73, i.e., in the vicinity of the orientation films 76 ad 78 form a twist angle of 90 degrees, for example, when projected on the XY plane. Thus, the liquid crystal layer 71 interposed between the pair of the polarization filters 31b and 31c are operated in normally white mode, and the maximum transmission condition (light ON condition) can be secured under the OFF condition in which no voltage is applied. As will be described later in detail, at both ends of the liquid crystal layer 71, i.e., in the vicinity of the orientation films 76 and 78 the optical axes of the liquid crystal compounds do not extend accurately parallel with the incident surface and exit surface opposed to the XY plane, i.e., the orientation films 76 and 78. That is, the optical axes of the liquid crystal compounds are inclined to the incident surface and exit surface at a certain pre-tilt angle. More specifically, the optical axes of the liquid crystal compounds in the liquid crystal layer 71 are disposed in such an angle condition that the twist angle around an axis parallel with the system optical axis SA gradually increases according to the positions of the liquid crystal compounds in the axis parallel with the axis SA while maintaining inclined condition to the system optical axis SA.

On the other hand, under ON condition in which voltage is applied to the liquid crystal layer 71, i.e., light shielding condition (light OFF condition), the optical axes of the liquid crystal compounds disposed away from the orientation films 76 and 78 are disposed in a direction parallel with the normal line of the first substrate 72 (specifically Z direction). However, the optical axes of the liquid crystal compounds at both ends of the liquid crystal layer 71, i.e., in the vicinity of the orientation films 76 and 78 are maintained substantially in the original condition. More specifically, the optical axes of the liquid crystal compounds on the incident side or exit side extend in the X direction and Y direction along the polarization surfaces of the first and second polarization filters 31b and 31c, but extend neither in parallel nor perpendicular to the incident surface and exit surface opposed to the XY surface, i.e., the orientation films 76 and 78. That is, the optical axes of the liquid crystal compounds on the incident side or exit side are maintained to be inclined to the system optical axis SA in such a manner as to be inclined to the incident surface and exit surface at a certain tilt angle or pole angle. The optical axes of the liquid crystal compounds located in the vicinity of the orientation films 76 and 78 are maintained in such a condition as to be inclined to the XY surface or Z axis with possible fluctuation under both the OFF condition in which no voltage is applied to the liquid crystal layer 71 and the ON condition in which voltage is applied thereto. Thus, in case of optical compensation for the liquid crystal layer 71 under the ON condition, i.e., the light shielding condition, the inclination angle corresponding to the inclination condition discussed herein is referred to as pre-tilt angle.

The first optical compensation plate OC1 disposed on the incident side of the liquid crystal device 80 is formed by a flat-plate-shaped crystal plate as an optical material having positive uniaxial refractive index. This crystal plate may be supported by a sheet of flat-plate-shaped glass plate, or may be a flat-plate-shaped single crystal plate. The optical axis of the first crystal plate constituting the first optical compensating plate OC1 extends parallel with the XZ axis and has a predetermined optical axis pole angle to the Z axis, for example. That is, the optical axis of the first crystal plate constituting the first optical compensating plate OC1 is inclined to the system optical axis SA, and extends in the X axis direction, for example. In this structure, the thickness of the first optical compensating plate OC1 refers to the effective thickness of the first crystal plate. This thickness d1 is set at a value appropriate for achieving optical compensation considering the F value of the input light LI as will be described later in detail.

The second optical compensating plate OC2 disposed on the exit side is also formed by a flat-plate-shaped crystal plate. This crystal plate may be sandwiched between a pair of flat-plate-shaped glass plates and affixed thereto, for example, or may be a flat-plate-shaped single crystal plate. The optical axis of the second crystal plate constituting the second optical compensating plate OC2 extends parallel with the YZ axis and has a predetermined optical axis pole angle to the Z axis, for example. That is, the optical axis of the second crystal plate constituting the second optical compensating plate OC2 is inclined to the system optical axis SA, and extends in the Y axis direction, for example. In this structure, the thickness of the second optical compensating plate OC2 refers to the effective thickness of the second crystal plate. This thickness d2 is set at a value appropriate for achieving optical compensation considering the F value of the output light LO.

The first and second optical compensating plates OC1 and OC2 discussed above have function of compensating visibility angle dependency and lowering of contrast caused by the pre-tilt of the liquid crystal layer 71 in cooperation with each other. More specifically, the first crystal plate provided on the first optical compensating plate OC1 and the second crystal plate provided on the second optical compensating plate OC2 effectively cancel liquid crystal retardation caused by the pre-tilt of the liquid crystals positioned at the incident end and the exit end of the liquid crystal layer 71 considering the angle conditions of the input light LI and output light LO. Thus, the respective azimuths and optical axis pole angles of the optical axes of the first and second crystal plates constituting the first and second optical compensating plates OC1 and OC2 and the respective thickness d1 and d2 of the optical compensating plates OC1 and OC2 are controlled during manufacture of the optical compensating plates OC1 and OC2.

Figure 3:
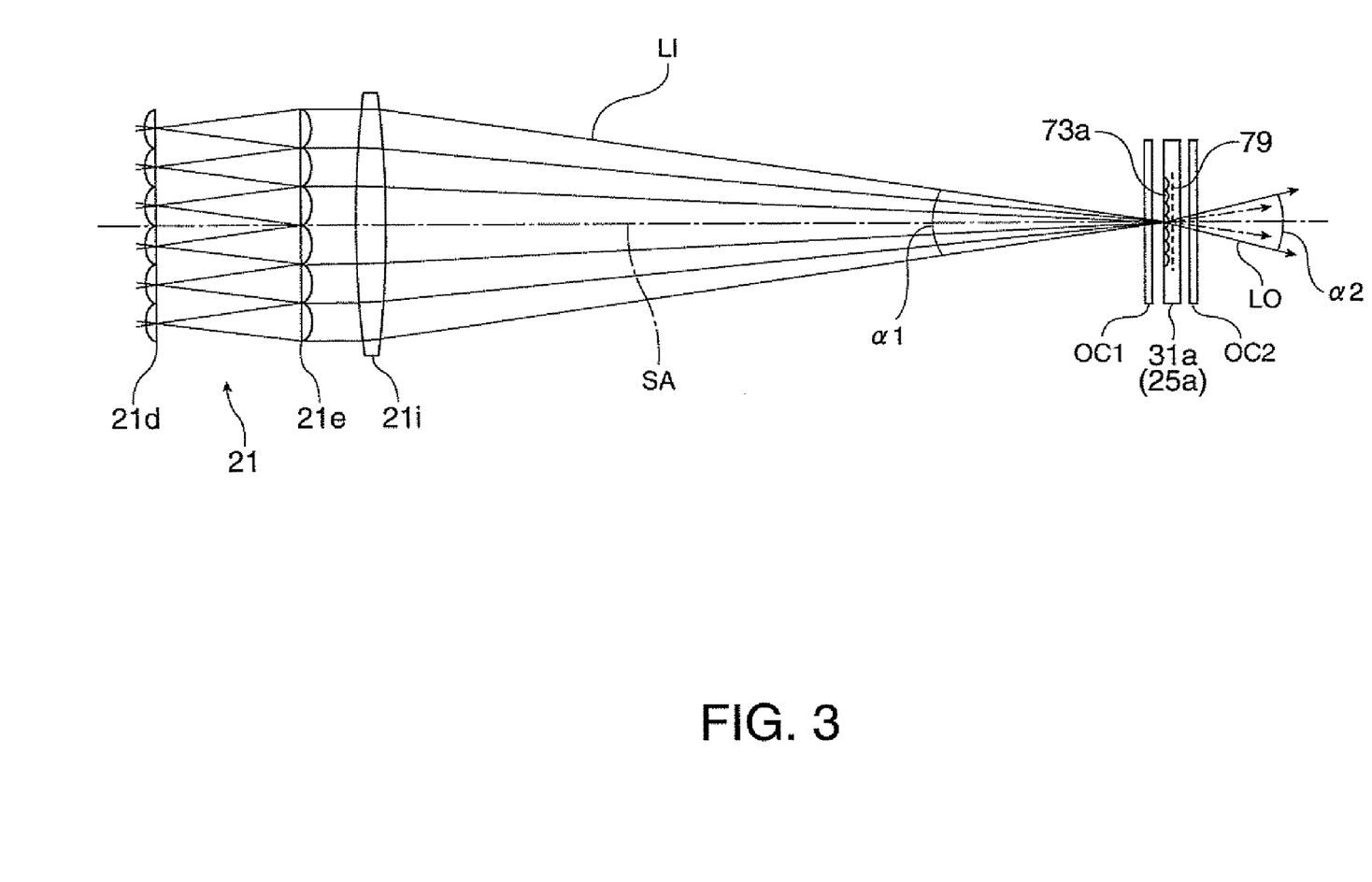
FIG. 3 is an exploded view showing conditions of input light and output light to and from a liquid crystal panel.

FIG. 3 is an exploded view illustrating condition of the input light LI entering the liquid crystal panel 31a and condition of the output light LO released from the liquid crystal panel 31a. In this case, the liquid crystal panel 31a corresponds to the liquid crystal panel 25a for blue light, for example, and the first optical path OP1 extends along the system optical axis SA in the figure. As can be seen from the figure, an angular aperture $\alpha 2[°]$ of the output light LO released from a particular pixel on the liquid crystal panel 31a is larger than an angular aperture $\alpha 1[°]$ of the input light LI entering the corresponding pixel on the liquid crystal panel 31a due to the effect of the micro-lens array 72a. More specifically, the FN1 as the F value on the incident side of the liquid crystal panel 31a is $(\tan(90°-\alpha 1/2))/2$, and the FN2 as the F value on the exit side of the liquid crystal panel 31a is $(\tan(90°-\alpha 2/2))/2$. Thus, the F value FN1 on the incident side is larger than the F value FN2 on the exit side, and the thickness d1 of the first optical compensating plate OC1 is larger than the thickness d2 of the second optical compensating plate OC2 accordingly. More specifically, the ratio of the second optical compensating plate OC2 to the thickness d1 of the first optical compensating plate OC1 (thickness ratio) is substantially equivalent to the ratio of the F value FN2 of the liquid crystal panel 31a on the exit side to the F value FN1 of the liquid crystal panel 31a on the incident side (F value ratio). Thus, the following relationship holds:

$$d2/d1 \approx FN2/FN1 \quad (1)$$

For reducing the effect on the compensating function of the second optical compensating plate OC2 caused by the convergence of the micro-lens array 72a, it is preferable that the following relationship:

$$r2/r1 \approx FN2/FN1 \quad (2)$$

holds such that the ratio of a second retardation r2 of the second optical compensating plate OC2 to a first retardation r1 of the first optical compensating plate OC1 (retardation ratio) in the system optical axis SA direction becomes substantially equivalent to the ratio of the F value FN2 of the liquid crystal panel 31a on the exit side to the F value FN1 of the liquid crystal panel 31a on the incident side (F value ratio). When this relationship holds, it is considered that the compensating functions of the first and second optical compensating plates OC1 and OC2 can be balanced. More specifically in this point, the first optical compensating plate OC1 is disposed on the incident side of the micro-lens array 72a, and the second optical compensating plate OC2 is disposed on the exit side of the micro-lens array 72a. Considering that the divergence angle of light increases while passing through the micro-lens array 72a, it is obvious that the optical path becomes effectively longer on the second optical compensating plate OC2 side than on the optical compensating plate OC1 side. That is, when the F value of the second optical compensating plate OC2 is smaller than that of the first optical compensating plate OC1, the inclination angle of the output light LO passing the second optical compensating plate OC2 to the system optical axis SA becomes larger by the amount corresponding to the difference between the F values of the first and second optical compensating plates OC1 and OC2. Thus, the compensating functions of the optical compensating plates OC1 and OC2 can be balanced by canceling the increase in the optical path due to lowering of the F value by the decrease in the retardation. According to this embodiment, the first and second optical compensating plates OC1 and OC2 are constituted by the same inorganic material, that is, crystal, and thus have equal refractive index (average) as will be described later in detail. The optical axis pole angles of the first and second optical compensating plates OC1 and OC2 with respect to the system optical axis SA direction are determined at an equal angle. Thus, for balancing the compensating functions of the first and second optical compensating plates OC1 and OC2, the thickness of the second optical compensating plate OC2 relative to the thickness of the first optical compensating plate OC1 is controlled such that the above relationship (1) holds.

FIGS. 4A through 4D are perspective views illustrating the concept of compensation for the pre-tilts of the first and second optical compensating plates OC1 and OC2 (that is, compensation for liquid crystal retardation). This description with reference to FIGS. 4A through 4D is applied to the entering light to the liquid crystal light valve 31 in the vertical direction.

Figure 4A:
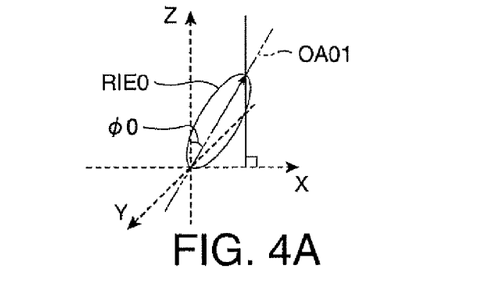
FIGS. 4A through 4D show compensation for pre-tilt provided by first and second optical compensating elements.

As shown in FIG. 4A, the average pre-tilt of the liquid crystal layer 71 on the incident surface side is substantially in parallel with the XZ plane and inclined at an angle $\phi 0$ to the Z axis parallel with the system optical axis SA, for example. More specifically, an optical axis OA01 of a refractive index ellipsoid RIE0 having this pre-tilt is inclined to the Z axis by a pole angle $\phi 0$, and the optical axis OA01 extends substantially in the +X direction. Particularly the optical axis of the liquid crystal compound at a position extremely close to the incident surface of the liquid crystal layer 71 is equal to the pre-tilt angle before voltage is applied. In this case, the angle formed by this optical axis and the incident surface is generally smaller than 10°. The optical axis of the liquid crystal compound rapidly becomes closer to an angle at which the optical axis is parallel with the incident surface normal direction, i.e., the Z direction, as the position comes toward the central portion of the liquid crystal layer when voltage is applied.

Figure 4B:
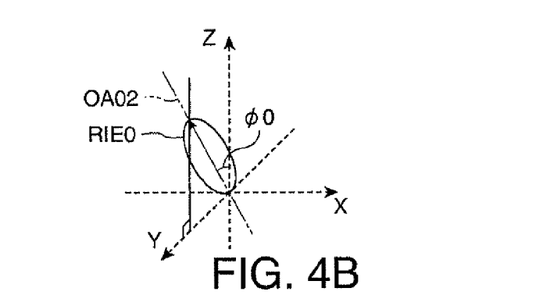

As shown in FIG. 4B, it is considered that the average pre-tilt on the exit surface side of the liquid crystal layer 71 is inclined to the Z axis substantially parallel to the YZ plane and parallel to the system optical axis SA by an angle of $\phi 0$, for example. That is, an optical axis OA02 of the pre-tilt refractive index ellipsoid RIE0 is inclined to the Z axis by the pole angle $\phi 0$, and the optical axis OA02 extends substantially in the +Y axis direction. Particularly the optical axis of the liquid crystal compound located extremely close to the exit surface of the liquid crystal layer 71 has an angle equivalent to the pre-tilt angle before voltage is applied, and the angle formed by this optical axis and the incident surface is generally about less than 0°. When voltage is applied, the angle of the optical axis of the liquid crystal compound rapidly becomes closer to the angle parallel with the exit surface normal line direction, i.e., the Z axis as the position of the liquid crystal compound shifts toward the central portion of the liquid crystal layer.

Figure 4C:
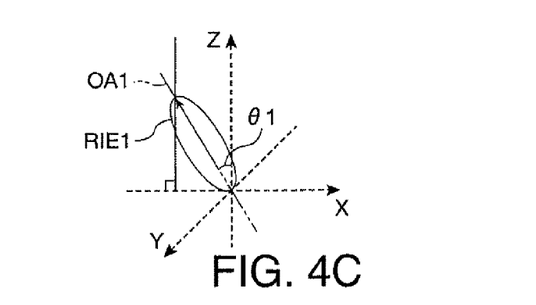
Figure 4D:
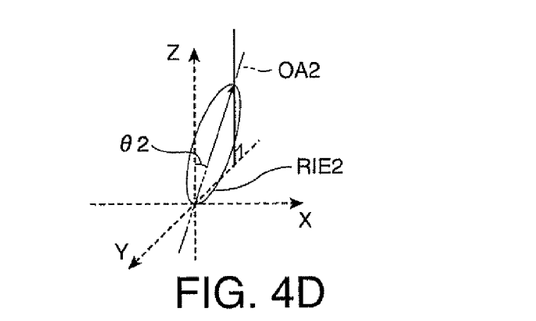

As shown in FIG. 4C, an optical axis OA1 of a refractive index ellipsoid RIE1 of the first crystal plate constituting the first optical compensating plate OC1 is substantially parallel with the XZ plane containing the X direction corresponding to the rubbing direction and inclined to the Z axis parallel with the system optical axis SA by an optical axis pole angle θ1. As shown in FIG. 4D, an optical axis OA2 of a refractive index ellipsoid RIE2 of the second crystal plate constituting the second optical compensating plate OC2 is substantially parallel with the YZ plane containing the Y direction corresponding to the rubbing direction and inclined to the Z axis parallel with the system optical axis SA by an optical axis pole angle θ2.

Figure 5:
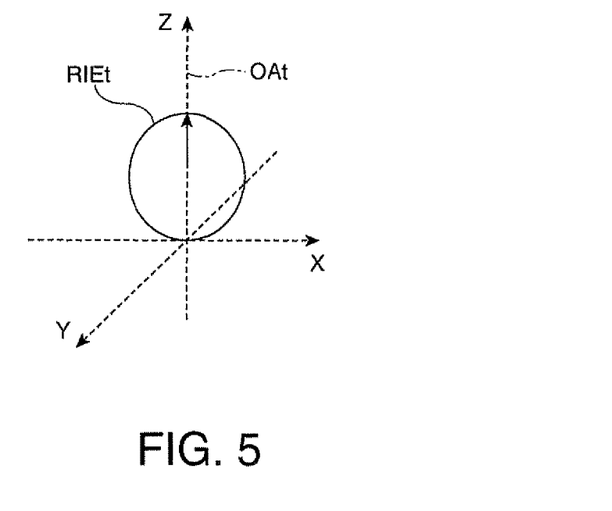
FIG. 5 shows concept of compensation effect produced by the first and second optical compensating elements.

FIG. 5 shows the concept of the overall effect of compensation provided by the first and second optical compensating plates OC1 and OC2. A refractive index ellipsoid RIEt obtained by combining the pre-tilt of the liquid crystals positioned near the incident surface and the exit surface and the refractive index anisotropies of the first and second crystal plates constituting the optical compensating plates OC1 and OC2 has such positive uniaxial refractive index characteristics that an optical axis OAt of the ellipsoid RIEt is the major axis parallel with the Z axis. The refractive index ellipsoid RIEt is circular and has equal refractive index within the XY plane as viewed in the Z direction. Thus, the refractive index ellipsoid RIEt compensates liquid crystal retardation produced by the pre-tilt of the liquid crystal layer 71. Moreover, the refractive index ellipsoid RIEt reduces entering direction dependency of the entering light inclined to the liquid crystal layer 71. Thus, deterioration of visibility angle characteristics due to liquid crystal retardation can be reduced.

The above description is applied to illumination light entering the liquid crystal light valve 31 in the vertical direction, but in fact the input light LI expands in the range of the F value FN1. For dealing with the input light LI having this range, the performance of the liquid crystal light valve 31 needs to be secured through simulation or trial manufacture. As discussed above, the F value FN2 on the exit side is smaller than the F value FN1 on the incident side due to the effect of the micro-lens array 72a. Thus, the retardation r2 of the second optical compensating plate OC2 needs to be smaller than the retardation r1 of the first optical compensating plate OC1 in an appropriate manner.

The F values of the input light and output light to and from the liquid crystal panel 31a and the retardations of the pair of the optical compensating plates OC1 and OC2 are specifically described herein. Table 1 shown below contains integrals of retardations of the first and second optical compensating plates OC1 and OC2 calculated through experiments when the F values FN1 and FN2 of the input light and output light to and from the liquid crystal panel 31a are varied. It is assumed that the thicknesses of the optical compensating plates OC1 and OC2 are equal.

TABLE 1

| F value | | Retardation integral (nm) | | Retardation integral | F value |
| --- | --- | --- | --- | --- | --- |
| input (FN1) | output (FN2) | input (R1) | output (R2) | ratio (R2/R1) | ratio (FN1/FN2) |
| 1.6 | 1.4 | 729 | 855 | 1.2 | 1.2 |
| 2.0 | 1.6 | 601 | 729 | 1.2 | 1.2 |
| 2.0 | 1.4 | 601 | 855 | 1.4 | 1.5 |
| 2.4 | 2.0 | 516 | 601 | 1.2 | 1.2 |
| 2.4 | 1.6 | 516 | 729 | 1.4 | 1.4 |
| 2.4 | 1.4 | 516 | 855 | 1.7 | 1.7 |

In this table, the F value F1 of the input light LI is simulated by setting the light in the diagonal direction as reference since the input light LI has a rectangular cross section. The first retardation R1 multiplied by the F value on the incident side and the second retardation R2 multiplied by the F value on the exit side are approximated for the optical compensating element in the optimum thickness condition when disposed on the exit side. In this case, the azimuth of the input light LI is varied every 30° in the range from 0° to 360°, and the pole angle is varied every β/4[°] in the range from 0° to β[°] (set according to F value). In this condition, the multiplied retardations r1, r2 and the like are calculated. Before simulation, the contrast of the liquid crystal light valve 31 is calculated while varying the thicknesses of the first and second optical compensating plates OC1 and OC2. By this method, the thicknesses are optimized to improve contrast.

Figure 6:
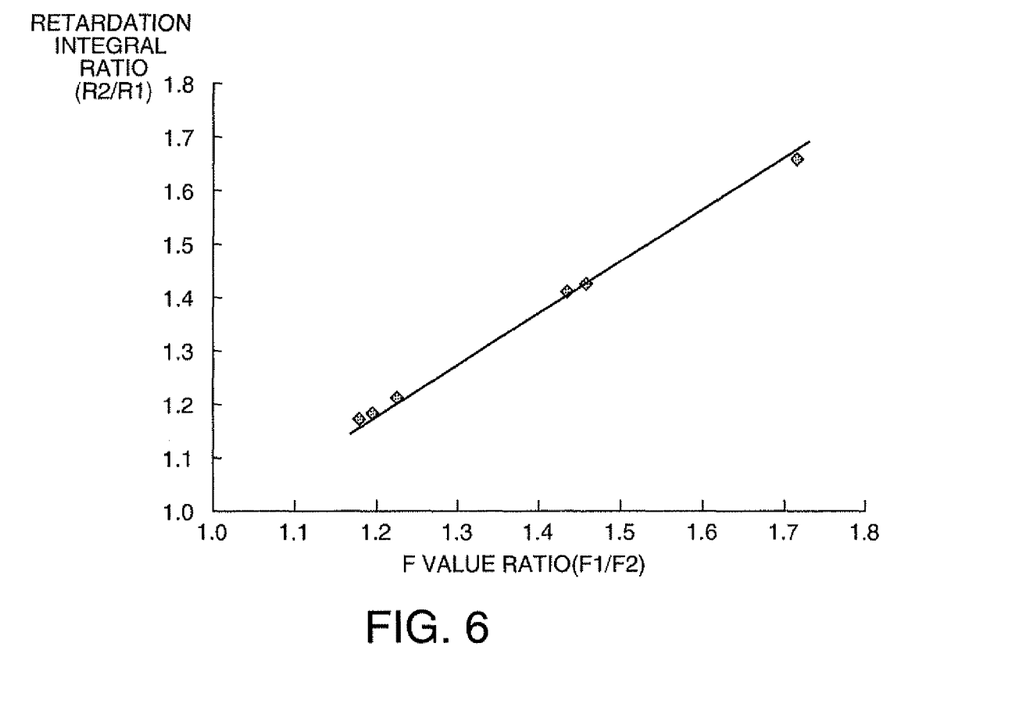
FIG. 6 is a graph showing the relationship between F value ratio and input/output retardation integral ratio.

FIG. 6 is a graph showing the relationship between the F value ratio FN1/FN2 and the retardation integral ratio R2/R1. The ratio R2/R1 refers to a ratio between the calculated exit side F value and the calculated incident side F value of the retardation integrals of the liquid crystal panel 31a. In this case, the F value ratio FN1/FN2 is an inverse number of the F value ratio FN2/FN1 in the relationship (1) shown above. As can be seen from the graph, the F value ratio FN1/FN2 is equal to the retardation integral ratio R2/R1. For canceling the effect of the difference between the F values on the incident side and exit side, the first retardation R1 multiplied by the F value on the incident side needs to be equal to the second retardation R2 calculated by the F value on the exit side. For satisfying this requirement, the thickness of the first optical compensating plate OC1 is required to be larger than the thickness of the second optical compensating plate OC2 by the amount of R1/R2 (=FN2/FN1). When the relationships (1) and (2) shown above are satisfied, the compensation functions of the first and second optical compensating plates OC1 and OC2 are balanced. As a result, the contrast and visibility angle characteristics of the liquid crystal light valve 31 can be improved.

According to this description, the liquid crystal light valve 31 corresponds to the liquid crystal panel 25a and the polarization filter 25e for blue light, but this description is similarly applicable to the liquid crystal panels 25b and 25c and the polarization filters 25f and 25g for other colors. More specifically, in the liquid crystal panels 25b and 25c, the compensating functions of the optical compensating plates OC1 and OC2 can be balanced by disposing the first optical compensating plate OC1 on the incident side and the second optical compensating plate OC2 on the exit side and controlling the thicknesses of the optical compensating plates OC1 and OC2 and the like according to the input/output F value ratio.

As apparent from the above description, even when the input light LI entering the liquid crystal panel 31a of the liquid crystal light valve 31 included in the projector 10 in this embodiment is subjected to geometrical and optical change for further diffusion by the effect of the micro-lens array 72a and thus increases the F value, the compensating functions of the first and second optical compensating plates OC1 and OC2 can be constantly balanced such that the effect of this geometrical and optical change, i.e., increase in the F value can be cancelled due to the condition that the first retardation r1 of the first optical compensating plate OC1 is larger than the second retardation r2 of the second optical compensating plate OC2. Thus, the compensation by the first and second optical compensating plates OC1 and OC2 is improved, and the contrast and visibility angle characteristics of the liquid crystal light valve 31 are enhanced. As a result, the contrast of the projection image from the projector 10 can be improved.

The invention is not limited to the embodiment described and depicted herein, and it is thus intended that various modifications and changes may be made without departing from the scope and spirit of the invention. For example, the following modifications may be made.

In this embodiment, the difference between the input/output F values FN2 and FN1 is compensated by controlling the thickness ratio t2/t1 of the first and second optical compensating plates OC1 and OC2. However, the difference between the input/output F values FN2 and FN1 can be similarly compensated by controlling the optical axis pole angles θ1 and θ2 set for the first and second optical compensating plates OC1 and OC2. Furthermore, the difference between the input/output F values FN2 and FN1 can be compensated by using other refractive index anisotropic material for the first and second optical compensating plates OC1 and OC2 and controlling the refractive index, thickness and other conditions of the optical compensating plates OC1 and OC2 in an appropriate manner.

While the first and second optical compensating plates OC1 and OC2 are constituted by crystal plates in this embodiment, other positive uniaxial inorganic crystal material may be used for the material of the optical compensating plates OC1 and OC2 instead of crystal plate. Moreover, negative uniaxial inorganic crystal material such as sapphire may be used for the material of the optical compensating plates OC1 and OC2 in place of crystal plate. Furthermore, evaporation film having optical anisotropy can be used while controlling the thickness of the film in lieu of crystal plate.

While inorganic material such as crystal plate is used for the material of the first and second optical compensating plates OC1 and OC2, organic material (such as drawn film and liquid crystal) may be used for the optical compensating plates OC1 and OC2 instead of crystal plate. When drawn film is used for compensation, the optical compensating plates OC1 and OC2 are controlled such that the Rth of the first optical compensating plate OC1 becomes relatively large and that the Rth of the second optical compensating plate OC2 becomes relatively small. When liquid crystal is used for compensation, the compensating plates OC1 and OC2 are controlled such that the thickness of the first optical compensating plate OC1 becomes relatively large and that the thickness of the second optical compensating plate OC2 becomes relatively small.

In this embodiment, the first and second optical compensating plates OC1 and OC2 are disposed away from the liquid crystal device 80. However, the optical compensating plates OC1 and OC2 may be affixed to the liquid crystal panel 31a by using transparent adhesive, for example.

In this embodiment, though the liquid crystal device 80 constituting the liquid crystal panel 31a operates in twist nematic mode the liquid crystal device 80 is not limited to one operating in twist nematic mode. For example, the liquid crystal device 80 may be formed by combining VA-type liquid crystal layer operating in VA mode and the micro-lens array 72a. In this case, the first polarization filter 31b is disposed on the incident side of the liquid crystal device 80 (that is, the incident side of the micro-lens array 72a), and the first optical compensating plate OC1 is disposed between the liquid crystal device 80 and the first polarization filter 31b in a typical structure. Also, the second polarization filter 31c is disposed on the exit side of the liquid crystal device 80, and the second optical compensating plate OC2 is disposed between the liquid crystal device 80 and the second polarization filter 31c. In this case, the thickness of the second optical compensating plate OC2 is made smaller than that of the first optical compensating plate OC1, for example, and the retardation of the first optical compensating plate OC1 in the system optical axis SA direction is made larger than that of the second optical compensating plate OC2 in the system optical axis SA direction. In this structure, even when the first and second optical compensating plates OC1 and OC2 are subject to geometrical and optical change for diffusing light entering the liquid crystal panel 31a by the effect of the micro-lens array 72a, the first and second optical compensating plates OC1 and OC2 can operate or function in an appropriate manner such that this effect can be cancelled.

In this embodiment, the projector 10 includes the light source device 21 having the light source lamp 21a, a pair of the lens arrays 21d and 21e, the polarization converting member 21g, and the superimposing lens 21i. However, the lens arrays 21d and 21e, the polarization converting member 21g, and other components may be eliminated, and the light source lamp 21a may be replaced with other light source such as LED.

In this embodiment, images in respective colors are combined by the cross dichroic prism 27 after color separation of illumination light using the color separating system 23 and modulation of the respective color lights using the light modulating unit 25 are finished. However, images may be formed by using a single liquid crystal panel, that is, the liquid crystal light valve 31.

While only the projector 10 having the three liquid crystal panels 25a through 25c has been discussed, the invention is applicable to a projector having two liquid crystal panels, or a projector having four or more liquid crystal panels.

While only the front-type projector which projects images in the direction for viewing the screen has been discussed, the invention is applicable to a rear-type projector which projects images in the direction opposite to the direction for viewing the screen.

The entire disclosure of Japanese Patent Application No. 2007-315489, filed Dec. 6, 2007 and Japanese Patent Application No. 2008-270609, filed Oct. 21, 2007 are expressly incorporated by reference herein.

What is claimed is:

1. A liquid crystal display device, comprising:
   a liquid crystal panel which has a liquid crystal device containing liquid crystal operating in twist nematic mode and a micro-lens array disposed adjacent to the liquid crystal device;
   a first optical compensating plate disposed on an incident side of the liquid crystal panel to optically compensate the liquid crystal device; and
   a second optical compensating plate disposed on an exit side of the liquid crystal panel to optically compensate the liquid crystal device,
   the first optical compensating plate and the second optical compensating plate being made of same inorganic substance, optical axis polar angles of the first and the second optical compensating plates with respect to system optical axis direction being set at an equal angle, and a thickness of the first optical compensating plate being larger than a thickness of the second optical compensating plate so that a first retardation of the first optical compensating plate in the system optical axis direction is larger than a second retardation of the second optical compensating plate in the system optical axis direction.

2. The liquid crystal display device according to claim 1:
   both the first and second optical compensating plates being flat-plate-shaped components made of inorganic substance; and
   the first retardation and the second retardation being determined based on the optical axis polar angle, refractive index, and the thickness of the first optical compensating plate with respect to the system optical axis direction, and the optical axis polar angle, refractive index, and the thickness of the second optical compensating plate with respect to the system optical axis direction, respectively.

3. The liquid crystal display device according to claim 2:
the optical axis of the first optical compensating plate being inclined to a direction parallel with the rubbing direction of an orientation film provided on either the incident side or exit side of the liquid crystal device; and
the optical axis of the second optical compensating plate being inclined to a direction parallel with the rubbing direction of an orientation film provided on the other of the incident side and exit side of the liquid crystal device.

4. A projector, comprising:
the liquid crystal display device for light modulation according to claim 1;
a lighting device which illuminates the liquid crystal display device; and
a projection lens which projects an image formed by the liquid crystal display device.

5. A projector, comprising:
the liquid crystal display device for light modulation according to claim 2;
a lighting device which illuminates the liquid crystal display device; and
a projection lens which projects an image formed by the liquid crystal display device.

6. A projector, comprising:
the liquid crystal display device for light modulation according to claim 3;
a lighting device which illuminates the liquid crystal display device; and
a projection lens which projects an image formed by the liquid crystal display device.

7. A liquid crystal display device, comprising:
a liquid crystal panel which has a liquid crystal device containing liquid crystal and a micro-lens array disposed on an incident side of the liquid crystal device;
a first optical compensating plate disposed on an incident side of the micro-lens array; and
a second optical compensating plate disposed on an exit side of the liquid crystal panel,
the first optical compensating plate and the second optical compensating plate being made of same inorganic substance, optical axis polar angles of the first and the second optical compensating plates with respect to system optical axis direction being set at an equal angle, and a thickness of the first optical compensating plate being larger than a thickness of the second optical compensating plate so that a first retardation of the first optical compensating plate in the system optical axis direction is larger than a second retardation of the second optical compensating plate in the system optical axis direction.

8. The liquid crystal display device according to claim 7, further comprising:
a first polarization plate disposed on the incident side of the liquid crystal panel; and
a second polarization plate disposed on the exit side of the liquid crystal panel,
the first optical compensating plate being disposed between the first polarization plate and the liquid crystal panel, and
the second optical compensating plate being disposed between the liquid crystal panel and the second polarization plate.

9. A projector, comprising:
the liquid crystal display device for light modulation according to claim 7;
a lighting device which illuminates the liquid crystal display device; and
a projection lens which projects an image formed by the liquid crystal display device.

10. A projector, comprising:
the liquid crystal display device for light modulation according to claim 8;
a lighting device which illuminates the liquid crystal display device; and
a projection lens which projects an image formed by the liquid crystal display device.

11. A liquid crystal display device according to claim 1:
wherein the system optical axis direction is parallel to the normal lines of the incident surface and the exit surface of the liquid crystal panel.

12. A projector, comprising:
the liquid crystal display device for light modulation according to claim 11,
a lighting device which illuminates the liquid crystal display device; and
a projection lens which projects an image formed by the liquid crystal display device.

* * * * *